United States Patent
Kashou et al.

(10) Patent No.: US 6,746,701 B2
(45) Date of Patent: Jun. 8, 2004

(54) PACKAGED, STACKED, OPENED POCKET BREAD AND METHOD THEREOF

(75) Inventors: John H. Kashou, Mequon, WI (US); George Kashou, Mequon, WI (US); Tony J. Schultz, Kohler, WI (US)

(73) Assignee: Kangaroo Brands, Inc., Milwaukee, WI (US)

( * ) Notice: Subject to any disclaimer, the term of this patent is extended or adjusted under 35 U.S.C. 154(b) by 174 days.

(21) Appl. No.: 10/006,084

(22) Filed: Dec. 6, 2001

(65) Prior Publication Data

US 2002/0071895 A1 Jun. 13, 2002

Related U.S. Application Data

(60) Provisional application No. 60/254,204, filed on Dec. 8, 2000.

(51) Int. Cl.⁷ ............................ B65D 85/62; B65B 25/16
(52) U.S. Cl. .................. 426/128; 426/106; 426/138; 426/392; 426/393; 426/397; 426/497; 206/499; 53/435; 53/447
(58) Field of Search ............................... 426/128, 138, 426/392, 397, 393, 106, 497; 206/499; 53/447, 435

(56) References Cited

U.S. PATENT DOCUMENTS

| | | | | |
|---|---|---|---|---|
| 2,892,719 A | * | 6/1959 | Lynn | 426/138 |
| 4,205,091 A | * | 5/1980 | Van Horne | 426/138 |
| 4,597,979 A | * | 7/1986 | Goglanian | 426/496 |
| 4,873,099 A | * | 10/1989 | Ruiz | 426/104 |
| 5,234,705 A | * | 8/1993 | Mani | 426/496 |
| 5,236,727 A | * | 8/1993 | Huston | 426/138 |
| 5,326,577 A | * | 7/1994 | Warnock | 426/124 |

* cited by examiner

Primary Examiner—Steve Weinstein
(74) Attorney, Agent, or Firm—Quarles & Brady LLP

(57) ABSTRACT

A method of preparation and delivery of pocket bread in which the pocket bread is cut immediately after baking, the walls of the pocket bread are separated along the cut line, and individual pieces of pocket bread are nested one inside another to create a stack. Each piece of pocket bread is therefore pre-opened, and the stack is packaged for delivery to consumers.

7 Claims, 2 Drawing Sheets

PACKAGED, STACKED, OPENED POCKET BREAD AND METHOD THEREOF

CROSS-REFERENCE TO RELATED APPLICATION

This claims the benefit of U.S. Provisional Patent Application No. 60/254,204 filed Dec. 8, 2000.

STATEMENT CONCERNING FEDERALLY SPONSORED RESEARCH OR DEVELOPMENT

Not applicable.

FIELD OF THE INVENTION

This invention relates to pocket bread, and in particular to a method of preparation, packaging and delivery of pocket bread to consumers.

BACKGROUND OF THE INVENTION

Pita, or pita bread, is used as a name for two types of bread, each possessing its own distinguishing characteristics and functionality. Pita is used to describe either a flat pita bread where the toppings or condiments are placed on top of the bread and the bread is either laid flat or folded over, or to a pocket bread, where a separation occurs between two layers of the bread. On visual examination, it is difficult for the average consumer to distinguish between the two varieties.

Pita pocket bread typically is made as a round disc and is packaged and delivered to the consumer as such. Pocket bread appears flat in the package and there is no visual appearance of the pocket. When a consumer takes the package home, opens it and removes a piece of pocket bread, the consumer will typically try to open the pocket bread by first cutting the disc in half, and then peeling apart the two layers. Depending upon the age of the product, the consumer can easily tear both sides of the pocket resulting in a loss of functionality.

SUMMARY OF THE INVENTION

The invention provides a method of preparing pocket bread, packaging it and delivering it to a consumer which overcomes the above problems. According to the invention, pieces of pocket bread are made in the conventional fashion. However, rather than placing the baked pieces in a package, the pieces are first cut, opened and nested inside one another. The nested stack of pocket bread pieces is then placed in the package for delivery to the consumer or to a resale outlet. The advantage of this is that it is easy upon visual inspection to see what the product is, i.e. pocket bread having a pocket, and the consumer need not open the pocket bread as it is pre-opened. Accordingly, there is little or no chance for the consumer to tear the sides of the pocket bread and the pocket bread retains its full functionality.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

According to the invention, pita pocket bread is first made according to any suitable recipe and baking method. For example, typically pita bread dough is mixed and cut into small three ounce disc-shaped circular dough pieces or the dough can be extruded by an extruder into a flat sheet approximately ¼ inch thick. If extruded, a die cutting roller can be used to cut dough discs, typically approximately six inches in diameter, from the sheet of dough. The cut pieces may be placed on a conveyor where they travel into a proof chamber allowing the pieces to rise and be ready for baking. Baking is accomplished in a tunnel oven operating at a temperature of about 750° F. for approximately 1 minute. As a result of the intense heat, quick bake time and thickness of the dough, the bread exits the oven inflated, almost like a soccer ball. This is as a result of steam buildup within the walls of the pocket. As the bread cools, the steam is released and the walls of the pocket collapse. The end product is a flat pita pocket bread but with no visible cavity.

Typically at this point the flat pocket bread is stacked and put into a plastic bag. After packing in plastic bags is complete, the bags may be placed in a box and frozen until use or shipment.

This is where the invention differs from the prior art. According to the invention, as soon after baking as possible, perhaps even while the bread is still warm, each pocket bread disc is cut in half along a radial line so that each disc-shaped pocket bread piece produces two semi-circular pocket bread pieces 10. The walls of each semicircular piece 10 along the cut edge are then separated so as to open up the pocket. Opening without tearing the walls is much easier immediately after the pocket bread is baked than it is after a day or two, even if the pocket bread is immediately packaged after baking. This is because after baking pocket bread, the bread ages, as do all breads, and the walls become somewhat brittle and less resistant to tearing.

Figure 1:
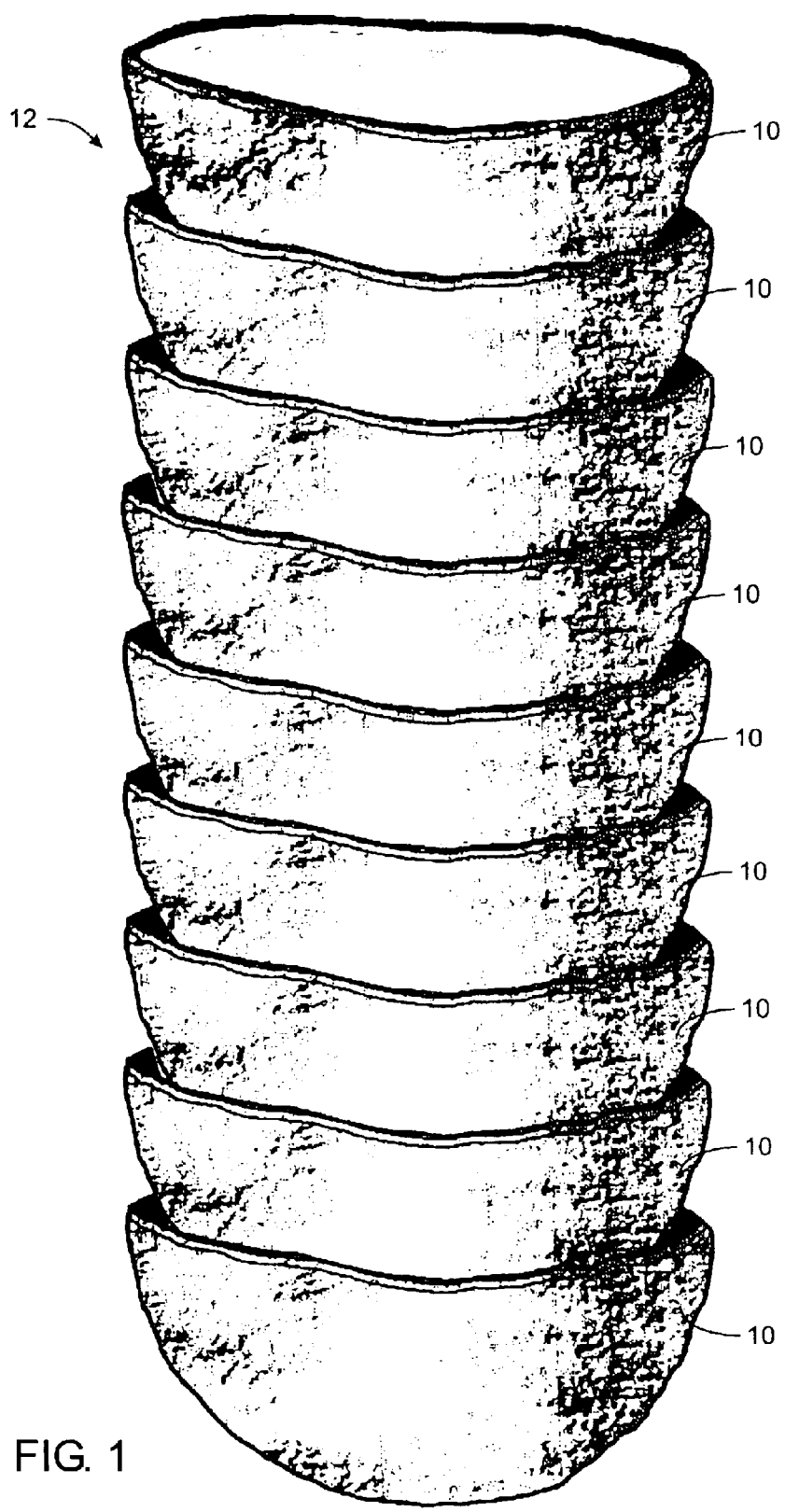
FIG. 1 is a perspective view of pocket bread pieces nested in a stack according to the invention.
Figure 2:
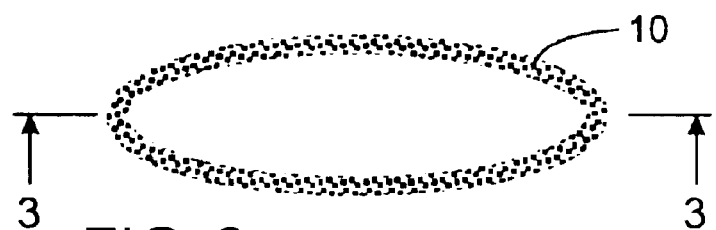
FIG. 2 is a top plan view of the stack.
Figure 3:
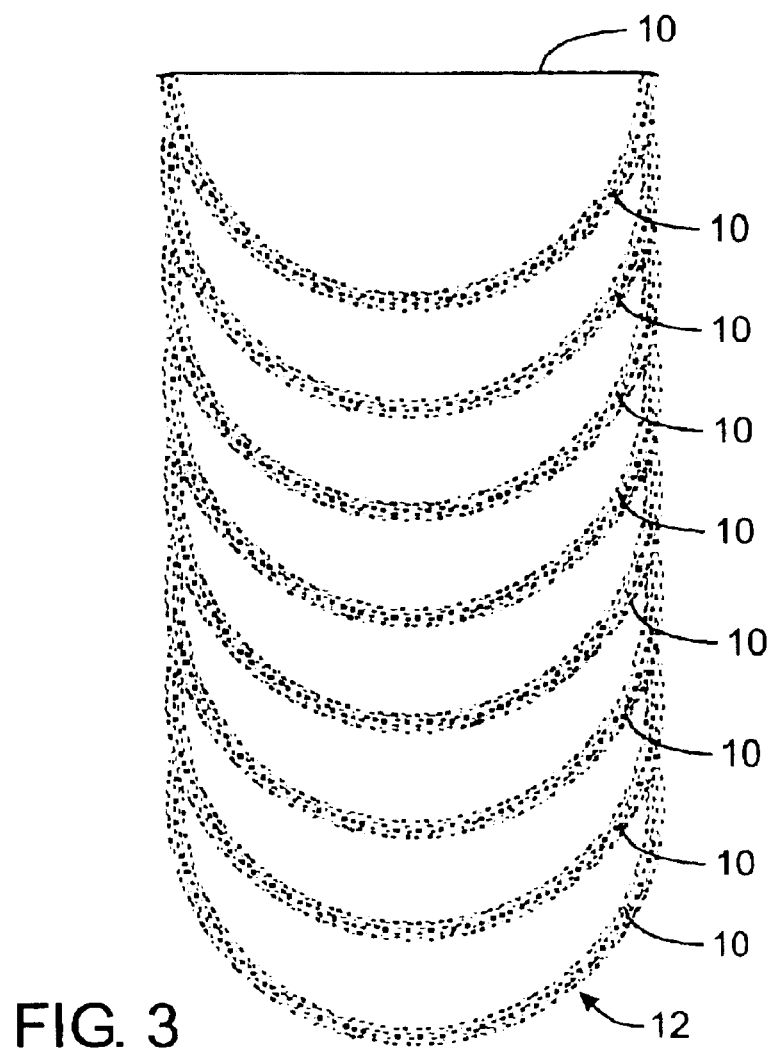
FIG. 3 is a cross-sectional view from the plane of the line 3—3 of FIG. 2.

After the semicircular pockets 10 are opened, they are preferably nested one inside the other as shown in FIG. 1. A stack 12 of nested bowl-shaped pocket bread pieces 10 can then be placed in a package, flattened somewhat so as to preserve space, and the package, which is preferably a transparent plastic, placed in a box and the box of packages frozen for later use, delivery to a resale outlet or delivery to a consumer. In the package, the pita pocket pieces are readily identifiable as pocket breads and upon opening the package, there is no need to cut the pita pocket pieces as they are ready for filling with whatever foods the consumer desires.

A preferred embodiment of the invention has been described. Modifications and variations to the preferred embodiment described will be apparent to those skilled in the art. Therefore, the invention should not be limited to the embodiment described, but should be defined by the claims which follow.

We claim:

1. A method of preparing pita pocket bread comprising, immediately after baking pocket bread, cutting each piece of pocket bread to form a cut edge, separating the walls of each piece of pocket bread at a respective cut edge to open a pocket, then, with their pockets open, nesting pieces of pocket bread, one inside the respective pocket of another, to form a nested stack of pita pocket bread, and then packaging the nested stack of pita pocket bread.

2. The method of claim 1, wherein said pocket bread pieces after being cut are generally semicircular in profile.

3. The method of claim 1, further comprising allowing the pocket bread pieces to cool after baking and before being nested one inside another.

4. The method of claim 1, wherein said packaging comprises inserting the stack of pocket bread pieces into a container for shipment.

5. The method of claim 1, wherein said packaging comprises inserting the stack of pocket bread pieces into a container; and freezing the container and the stack.

6. A package of pita pocket bread, wherein said package includes a stack of pocket bread pieces in which each individual piece of pocket bread has a cut edge and walls that have been separated at the cut edge to open the respective pocket of each piece, and wherein the pieces of pocket bread are nested one inside the respective pocket of another, to create a nested stack inside said package.

7. A package as claimed in claim 6, wherein each said pocket bread piece is generally semicircular in profile.

* * * * *